United States Patent
Balasubramanian

(10) Patent No.: US 10,433,360 B2
(45) Date of Patent: Oct. 1, 2019

(54) MANAGING A PACKET SERVICE CALL DURING CIRCUIT SERVICE CALL SETUP WITHIN MOBILE COMMUNICATIONS USER EQUIPMENT

(75) Inventor: Sanjeevi Balasubramanian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 933 days.

(21) Appl. No.: 13/397,532

(22) Filed: Feb. 15, 2012

(65) Prior Publication Data
US 2013/0208628 A1 Aug. 15, 2013

(51) Int. Cl.
H04W 76/16 (2018.01)
H04W 4/16 (2009.01)

(52) U.S. Cl.
CPC .............. *H04W 76/16* (2018.02); *H04W 4/16* (2013.01)

(58) Field of Classification Search
USPC .................................................. 370/352–356
See application file for complete search history.

(56) References Cited

U.S. PATENT DOCUMENTS

| 6,404,764 | B1 * | 6/2002 | Jones et al. ................. 370/352 |
| 7,460,515 | B1 | 12/2008 | Chowdhury et al. |
| 7,924,811 | B2 | 4/2011 | Asokan |
| 2003/0232629 | A1 * | 12/2003 | Jang et al. ................. 455/552.1 |
| 2005/0208948 | A1 * | 9/2005 | Hori ...................... H04W 76/02 455/452.1 |
| 2005/0215241 | A1 * | 9/2005 | Okada ....................... 455/414.1 |
| 2005/0226202 | A1 * | 10/2005 | Zhang et al. ................. 370/349 |
| 2006/0067513 | A1 * | 3/2006 | Maytal et al. ................ 379/395 |
| 2006/0114882 | A1 | 6/2006 | Mills |
| 2007/0058549 | A1 | 3/2007 | Speks et al. |
| 2007/0058789 | A1 * | 3/2007 | Lim et al. .................. 379/88.17 |
| 2007/0133519 | A1 | 6/2007 | Florkey et al. |
| 2007/0281727 | A1 * | 12/2007 | Bowen .......................... 455/522 |
| 2008/0062966 | A1 * | 3/2008 | den Hartog ............. H04L 12/66 370/352 |
| 2008/0090566 | A1 * | 4/2008 | Seo et al. .................... 455/426.1 |
| 2008/0270611 | A1 * | 10/2008 | Noldus et al. ................ 709/227 |

(Continued)

FOREIGN PATENT DOCUMENTS

| WO | WO 2005/104600 A1 | 11/2005 |
| WO | WO 2006/040515 A1 | 4/2006 |
| WO | WO 2011/150255 A2 | 12/2011 |

OTHER PUBLICATIONS

"3G-324M Toolkit For Developing 3G Conversational Multimedia and Streaming Enabled Entities", RADVISION®, Product Specification, 2007 RADVISION, Ltd., P/N 46008-00043, Rev A 01-07, (4 pages).

(Continued)

*Primary Examiner* — Khaled M Kassim
(74) *Attorney, Agent, or Firm* — Meyertons, Hood, Kivlin, Kowert & Goetzel, P.C.

(57) ABSTRACT

A packet service, PS, call manager within mobile communications user equipment receives a request for a packet service, PS, call from a background task that is running in the mobile communications user equipment. In response, the PS call manager checks whether or not there is a circuit service, CS, call that is in a setup phase; if so, then the PS call manager starts a count down timer and blocks the PS call until the count down timer has expired. Other embodiments are also described and claimed.

18 Claims, 4 Drawing Sheets

(56) References Cited

U.S. PATENT DOCUMENTS

| | | | |
|---|---|---|---|
| 2009/0086719 A1* | 4/2009 | Mutikainen et al. | 370/352 |
| 2010/0195641 A1* | 8/2010 | Tsai | 370/352 |
| 2010/0208670 A1* | 8/2010 | Zisimopoulos et al. | 370/329 |
| 2010/0284333 A1 | 11/2010 | Shirota et al. | |
| 2011/0021204 A1 | 1/2011 | Chaudry et al. | |
| 2011/0039537 A1 | 2/2011 | Madhavan et al. | |
| 2011/0103305 A1 | 5/2011 | Ali et al. | |
| 2011/0280166 A1* | 11/2011 | Nien | H04B 1/3816 370/310 |
| 2013/0016601 A1* | 1/2013 | Patil | H04W 76/064 370/216 |

OTHER PUBLICATIONS

"Guideline for 3G RF Optimization—American Movil LATAM Projects", Nokia Siemens Networks (NSN), Revised by: Danilo Cabral, Aug. 27, 2007, Version 1.1, Originators: Raj Sandhu, Allan Bispo and Daniel Platero, (92 pages—Whole Document).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-X(HB),Table of Contents, (14 pages).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-X(HB), Chapter 4 General Packet Radio Service, pp. 79-81, (3 pages).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-(HB),Chapter 4 General Packet Radio Service, pp. 91-92, (2 pages).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-X(HB), Chapter 4 General Packet Radio Service, pp. 129-142, (14 pages).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-X(HB), Chapter 6 Universal Mobile Telecommunications System, pp. 265-342, (80 pages).

Bannister, Jeffrey, et al., "Convergence Technologies for 3G Networks IP, UMTS, EGPRS and ATM", Copyright 2004, John Wiley & Sons Ltd., The Atrium, Southern Gate, Chichester, West Sussex, England, ISBN 0-470-86091-X(HB), Chapter 6 Universal Mobile Telecommunications System, pp. 381-386, (6 pages).

Bannister, Jeffrey, et al., "Convergence Technologies for 3G Networks IP, UMTS, EGPRRS and ATM", Copyright 2004, John Wiley & Sons Ltd., The Atrium, Southern Gate, Chichester, West Sussex, England, ISBN 0-470-86091-X(HB), Chapter 6 Universal Mobile Telecommunications System, pp. 407-414, (8 pages).

Boggia, G., et al., "Drop Call Probability in Established Cellular Networks: from data Analysis to Modelling", Vehicular Technology Conference, 2003, Internet download PDF/Adobe Acrobat at: citeseerx.ist.psu.edu/viewdoc/download?doi=10.1.1.104 . . . , (5 pages).

Schulzrinne, Henning, et al., "Interaction of Call Setup and Resource Reservation Protocols in Internet Telephony", Jun. 15, 1999, Internet download PDF/Adobe Acrobat at: www.cs.columbia.edu/sip/drafts/resource.pdf, (15 pages).

International Search Report and Written Opinion of the International Searching Authority, dated May 6, 2013, for corresponding International Application No. PCT/US2013/020958, 7 pages.

International Search Report and Written Opinion of the International Searching Authority, dated May 22, 2013, for corresponding International Application No. PCT/US2013/025413, 9 pages.

\* cited by examiner

MANAGING A PACKET SERVICE CALL DURING CIRCUIT SERVICE CALL SETUP WITHIN MOBILE COMMUNICATIONS USER EQUIPMENT

BACKGROUND

Mobile terrestrial communication networks can now provide the user of a mobile device such as a cellular phone or a smart phone both packet services and circuit services simultaneously. The circuit service enables the user of a smart phone to participate in delay sensitive multimedia communications, such as a live spoken conversation, via a voice or video call with a far-end user. This is referred to as a circuit service (CS) call. At the same time, the smart phone can conduct a data session with a remote server to, for instance, download a web page or upload its geo positional location data, as enabled by a packet service (PS) call. Simultaneous PS and CS calls are occurring more frequently as mobile communication network providers are willing to provide more services to their subscribers. When the mobile communications user equipment is in an area where there is relatively poor radio frequency (RF) coverage from a serving base station system, there is a higher probability that an ongoing CS call, or even a CS call that is in its setup phase, will be dropped by the network. One particular scenario for a potential CS call drop is where a CS call setup phase is in progress when a PS call is being established that was requested by a background task running in the user equipment.

SUMMARY

An embodiment of the invention is a method for managing, within mobile communications user equipment, a packet service (PS) call, so as to improve the likelihood that a call setup phase of a circuit service (CS) call will be completed, particularly when the user equipment finds itself in a poor RF coverage area. Also, timely blocking of an unsolicited background PS call should decrease the time needed to complete CS call setup, which will in turn improve the users perception. The method includes receiving a request to establish a PS call from a background task, while a CS call is in its call setup phase. During that time, and in response to the request being received, a check is made as to whether or not a CS call is in its setup phase. If so, then a count down timer is started, and the PS call is blocked at least until the count down timer has expired. When the timer expires, another check is made as to whether or not any CS call is in its call setup phase. If not, then the PS call may be allowed. The count down timer may be predetermined or set, to represent a fixed time interval, for example between two and four seconds where it is expected that a typical CS call setup phase could last on average about three seconds.

Such a technique may be useful when the requesting background task has a lower priority (for establishing a new PS call) than that of one other background task, which may also be running in the user equipment. Examples of such low priority background tasks include a game application that has been moved into the background, a location services task, and an email client in the background, all of which may need to access a remote server over the Internet at any given moment.

Another embodiment of the invention is a mobile telephony device (e.g., a smart phone) that has a processor and data storage in which are stored a telephony module and a PS call manager. The telephony module (when executed by the processor) can manage a CS call, by conducting a typical call setup phase for the CS call. The PS call manager may receive a user-unsolicited request to establish a PS call, e.g. from a low priority background task running in the mobile device; in response, the PS call manager checks whether or not there is a CS call that is in a call setup phase; if so, then activation of the PS call is delayed for predetermined time interval, but if not then the PS call may be activated immediately. In the case of the forced delay, at the end of the delay interval the PS call manager again checks to see if there is an ongoing CS call setup and if not then the PS call may be immediately activated.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
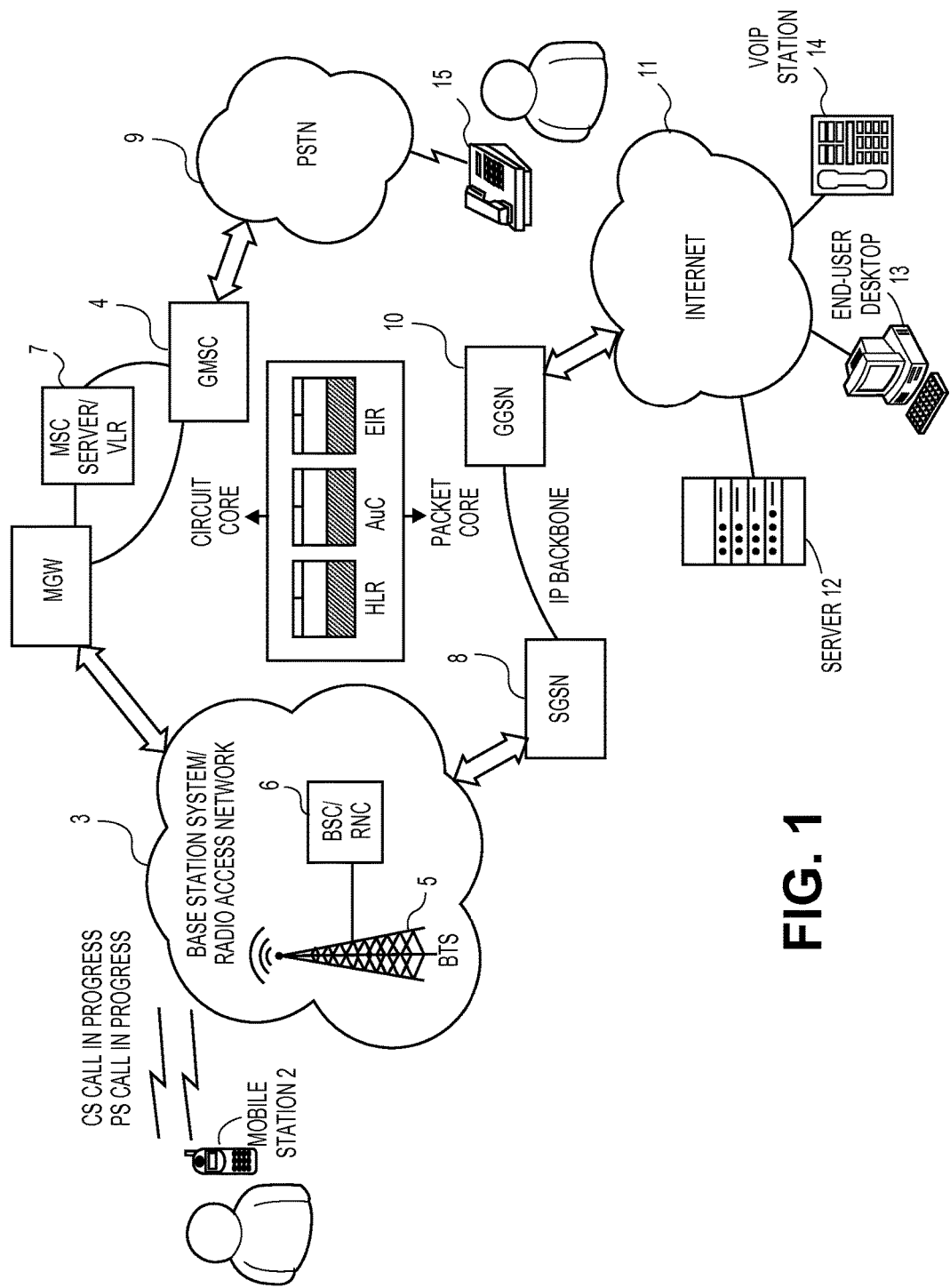
FIG. 1 is a block diagram of a mobile communications network showing a PS call and a CS call in progress simultaneously.

FIG. 1 is a block diagram of a mobile terrestrial communications network showing a PS call and a CS call. The mobile communication network includes a mobile station 2, in which the embodiments of the invention are implemented. The mobile station 2 is also referred to as mobile communications user equipment or a mobile telephony device. The device is a consumer electronics unit that is typically purchased by a user who may also be a subscriber to mobile communication services that are delivered via the network. Examples include a cellular telephone, a smart phone, a tablet computer, and a laptop or notebook computer. The device is capable of two-way real-time voice communications, also referred to as voice calls and video calls (e.g., cellular phone calls). Such calls require that the network guarantee a quality of service (QoS) in terms of reserving sufficient network resources so as to ensure a sufficiently short communications signal delay, in order to enable a natural sounding spoken conversation between the user and another user at a far-end of the communications network. The far-end user may be conducting the conversation through, for instance, landline telephone user equipment 15 which is an end node of a public switched telephone network (PSTN) 9. Such voice or video calls are examples of what are referred to here as circuit service (CS) calls, because traditionally a voice call was guaranteed the needed QoS by virtue of a dedicated circuit being assigned to the call by Plain Old Telephone Service (POTS), and that was created through which to connect the near-end and far-end user stations, for the entire duration of the call.

A CS call as used here is a wireless service for delay sensitive communications. CS calls are for applications that are more sensitive to bit error rates and to variant routing delays. Examples of such communications include two-way, real-time or live voice telephony. As suggested above, a CS call may be a service that can guarantee a fixed delay QoS. This is in contrast to a packet service (PS) call as described below, a service which the mobile station 2 is also capable of providing.

A PS call is a wireless service for delay tolerant Internet Protocol (IP) applications, such as email, chat, multimedia message service (MMS), MP3 streaming, multi-party gaming, electronic banking and electronic commerce, wireless imaging, presence (e.g., using session initiation protocol (SIP) service), and GPS/location based services. A PS call may not be able to guarantee a fixed delay QoS. Note that in the network depicted in FIG. 1, the PS call is entirely transported by a packet switched service in the packet core network, where the content to be communicated to and from the mobile station 2 is split into packets or segments and each segment has its own header information; not so with the CS call (while it is transported in the circuit core network). Another difference between the CS and PS call services lies in their QoS.

The mobile communications network can provide CS and PS calls that are in progress simultaneously. In other words, a user of the mobile station 2 can participate in a spoken conversation with the far-end user over the PSTN 9 (e.g., user of the landline station 15), while at the same time send an update or notification to a server 12 via the Internet 11. These may be, for instance, notifications from a client or mobile application running in the mobile station 2, that are directed to a game server, an instant messaging server (e.g., where an end-user desktop 13 also contains an instant messaging client that is alerted regarding the presence of a peer instant messaging client running in the mobile station 2) and a location services server.

To enable the provision of simultaneous PS and CS calls, the mobile communications network may be in accordance with the specifications provided by the third generation partnership project (3GPP) under General Packet Radio Service (GPRS) and universal mobile telecommunications system (UMTS). In this architecture, a radio access network (RAN) 3 has an air interface to the mobile station 2 that uses wideband code division multiple access (WCDMA), and a predominantly wired interface to the packet and circuit cores using asynchronous transfer mode (ATM) as the transport. The RAN 3 has several base transceiver stations (BTSs) also referred to as a wideband BTS (WBTS) 5, or a Node B as described in the 3GPP specifications. The WBTS 5 may support multipurpose wireless solutions, including transceivers for GSM, enhanced data rates for global evolution (EDGE), and microwave plesiochronous or synchronous digital hierarchy interfaces (PDH or SDH). The radio access network 3 also includes a base station controller or radio network controller (BSC/RNC) 6 in which decisions for network operation are made. It may contain a high-speed packet switch to support a reasonable throughput of CS and PS traffic (e.g., voice and data traffic). It is also responsible for control of all the WBTSs that are connected to it, and maintains a link to the packet and circuit cores, via a link to a media gateway (MGW) and a mobile switching center server/visitor location register (MSC server/VLR) 7 for the circuit core, and a separate link to a serving GPRS support node (SGSN) 8 for the packet core. Access to Internet services is provided by a gateway GPRS support node 10.

The circuit core may include, in addition to the MSC server/VLR 7, a high-speed data connection to a gateway MSC (GMSC) 4 which may be a gateway to a plain old telephone system analog network in the PSTN 9. The circuit core may be based on a traditional global system for mobile communications (GSM) core network that is typically used for providing cellular voice telephony services, while the packet core may be a general packet radio service (GPRS) core network that provides data services (traffic in the form of packets e.g., IPV4 or IPV6 packets, and usually referred to as non-voice services). The GPRS core network allows an existing GSM base station system infrastructure to be reused, where the latter was originally designed for a GSM voice network. GPRS traffic is redirected by the base station controller or radio network controller 6 to the packet core via a serving GPRS support node (SGSN) 8. The typical GSM functionality of the home location register (HLR), equipment identity register (EIR), and authentications center (AuC) are needed to support CS and PS calls with the mobile station 2. Such GSM functionality may thus be shared by the packet services so that a user of the mobile station 2 who is sending an email does not need their location information handled any differently than when making a phone call.

The packet core contains the SGSN 8 which connects to the radio access network 3 and performs authentication and mobility management. An IP backbone connects the SGSN 8 to a gateway GPRS support node (GGSN) 10 which is at the edge of and provides access to services on the Internet 11. The Internet Protocol may be used to connect the serving GPRS support node (SGSN) 8 with the gateway GPRS support node (GGSN) 10, allowing data services such as email or web browsing on the mobile station 2.

Figure 2:
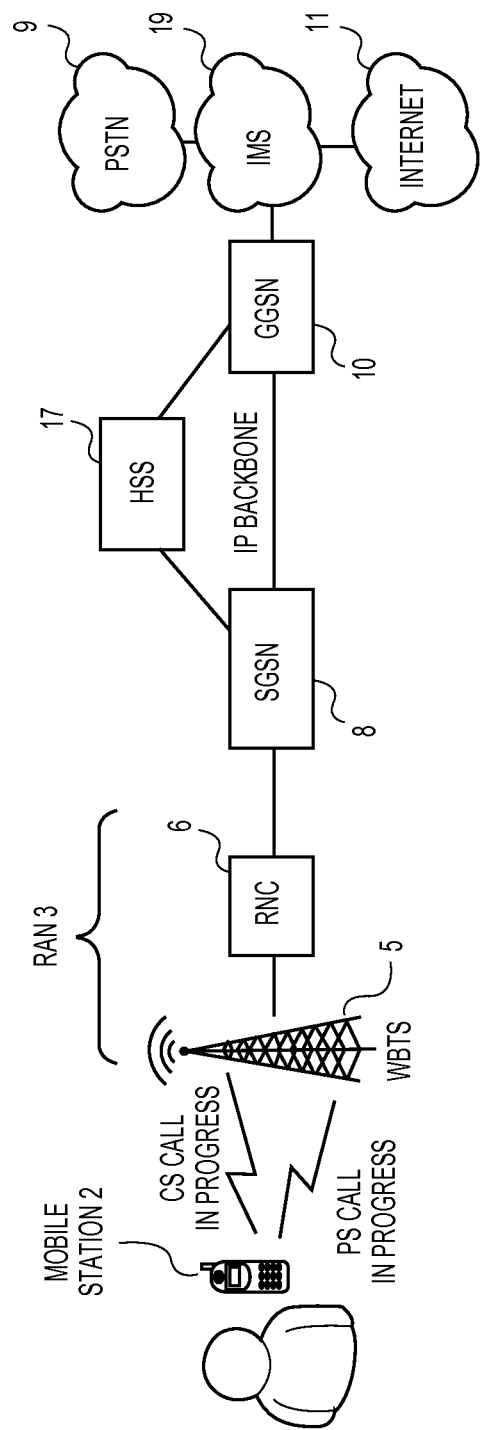
FIG. 2 is a block diagram of another mobile communications network supporting simultaneous CS and PS calls in progress.

The traditional architecture of FIG. 1 has evolved into that of FIG. 2, where the circuit core has been replaced with an IP network infrastructure that is based around voice over IP (VoIP) technology. The mobile communications network is now essentially made of several IP clouds, which may be merged into a single IP over ATM backbone as shown. The IP protocol thus extends across the whole communications network all the way to the WBTS 5. In this case, the home location register, visitor location register, and EIR may be generalized and referred to as the HLR subsystem or home subscriber server (HSS) 17. CS calls such as voice and video calls are supported through the introduction of an IP multimedia subsystem (IMS) 19. It should now be appreciated that while originally the reference to a CS call referred to a communications session that was established through a circuit core that was separate from a packet core, the evolved mobile network depicted in FIG. 2 uses the same core network infrastructure shown, including the now shared components of the SGSN 8 and the GGSN 10, to support both PS and CS calls simultaneously.

The radio access network (RAN) 3 provides a service described as a radio access bearer (RAB) to enable the transfer of user data between the mobile station 2 and the core mobile network. For each user connection to the core network, a RAB is established for transport of signaling or traffic. There may be multiple RABs that have been requested and then set up. A RAB assignment request is a message that initiates the establishment of a radio link and associated radio bearers in the core network. The request also contains the needed QoS parameters for the RNC to determine the requisite resource allocation for the radio link and the other requirements in order to meet the QoS. This is where a PS call may be distinguished from a CS call, that is, in the form of two RABs that have different QoS.

The mobile station 2 may be idle and is ready to connect to the network, for example, in response to a page or to perform a location update. After sending a connection request and receiving a response set up message from the radio network controller 6, a connection is established between the mobile station 2 and the RNC 6 such that the mobile station is now connected with the network. Once the mobile device is thus connected with the mobile network, it cannot start to send and receive data over the packet core until it has established a session, which may be referred to as an active packet data protocol context (PDP context). A PDP context is needed when the user selects a particular service by, for instance, scrolling through a menu that is being displayed in the mobile station 2 and selecting an Internet application such as a Web browser or a music streaming program. The PDP context activation results in the mobile station 2 obtaining an IP address. A request for an external network connection is passed from the mobile station through the network, to the SGSN 8. The SGSN 8 then locates the correct GGSN 10 which will be used to route data from the mobile station to the correct external network (e.g., the Internet). There may be more than one GGSN connected to the external network for load sharing and a redundancy. Once a PDP context has been activated in this manner (and the PS call is thus said to be established), the user can then use the services provided by an access point to the external network, in this example the Internet, e.g. surfing the web, checking email, and streaming music. The mobile station 2 may have several PDP contexts that are active at any one time, with one IP address for each primary PDP context that is activated.

Within the mobile station 2, the call setup phase of a CS call may be defined as follows. In one embodiment, the term "call setup phase" refers to the following interval in a GSM call flow (for a GSM originating call): between when the near-end user has just pressed the 'Send' button to when the conversation phase starts. In another embodiment, call setup phase refers to the following interval in a GSM call flow: between the sending of a channel request to the base station and the receipt of a connect message. In yet another embodiment, the call setup phase may encompass the idle, dialing, or calling/ringing intervals.

Now, during the call setup phase, a user-unsolicited PS call request might originate in the mobile station 2. Note that once the PS call request is allowed to proceed, e.g. by notifying the RNC 6 of the need for a PDP context, the RNC 6 may respond by assigning a less robust AMR audio codec for the CS call (which is still in its setup phase). In addition, signaling overhead is increased during the call setup phase. These aspects together may increase the likelihood that the CS call will dropped by the RNC 6 during its call setup phase, particularly when the mobile station 2 finds itself in a low RF coverage area. An embodiment of the invention may help decrease the likelihood of such CS call drops and improve (i.e., reduce) the call setup time.

Figure 3:
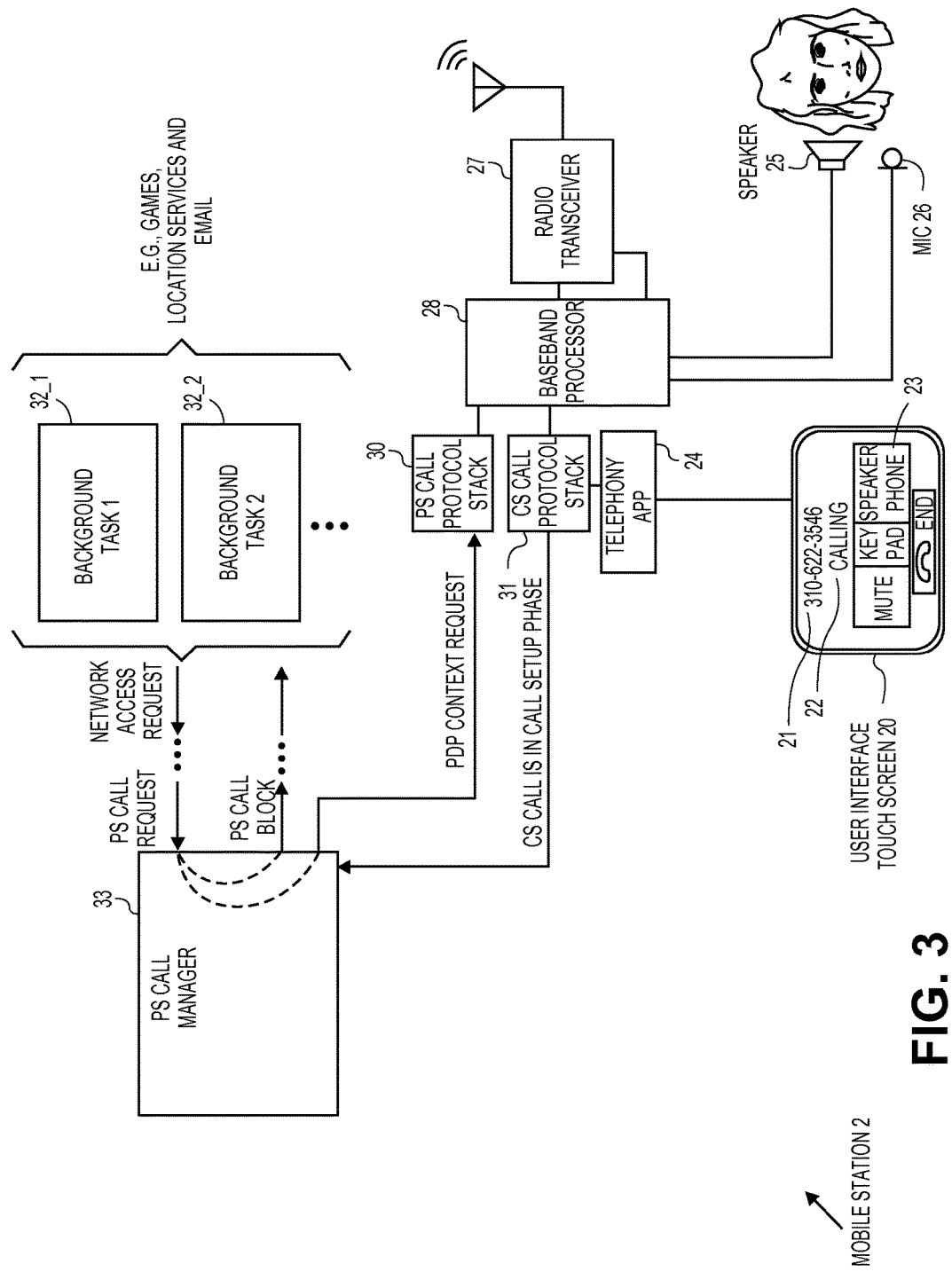
FIG. 3 is a combined software and hardware diagram of relevant portions of a mobile station or mobile communications user equipment, in accordance with an embodiment of the invention.

Turning now to FIG. 3, a combined software and hardware diagram of relevant portions of the mobile station 2, in accordance within an embodiment of the invention, is shown. There is a base band processor 28 and a radio transceiver 27. The base band processor 28 may be a GPRS/GSM base band processor that complies with release 99 UMTS protocol stack, or it may be a HSPA/EDGE multimedia base band processor that interfaces with an EDGE/HSPA multi-mode, multi-band cellular transceiver. The diagram also shows the situation where a CS call is in it call setup phase, meaning that for an outgoing call the near end user has pressed the 'Send' button but a two-way live media connection (e.g., audio only) has not yet been established, between the mobile station 2 and the far end device (e.g., VOIP station 14). The CS call may be an outgoing call from the mobile station 2 that has been manually dialed or initiated by the near end user, or it may be an incoming call. Note that once the media connection for this CS call has been established, a live two-way voice conversation can be conducted by the near end and far end users. Until then, the CS call may be said to be in its call setup phase which may include any one of the typical phases of idle, dialing, or calling/ringing.

A PS call manager 33 in the mobile station 2 receives a user-unsolicited request for a PS call in the mobile station 2. The request may be from from a background task 32 that is running in the mobile station 2. There may be several background tasks 32_1, 32_2, . . . as shown. The requesting background task 32 may be a game, a location service, an e-mail client, or other background task that may need access to an external network, i.e. outside the core mobile network. The PS call manager 33 will respond to the received PS call request by either blocking the call (issuing a PS call block, which may eventually make its way back to the requesting background task 32) or it may decide to allow or activate the call, by, e.g. sending a PDP context request to service the PS call request. This is depicted by the dotted lines in FIG. 3. The PDP context request may be signaled to a conventional PS call protocol stack 30, which may be present as part of the operating system running in the mobile station 2 together with a CS call protocol stack 31. The call protocol stacks 30, 31 may be part of a 3G-324M software tool kit that contains application programming interfaces for developing software that enables packet service and circuit service calls in a mobile station. It should be understood that the PS call manager 33, including the capabilities described below in connection with the algorithm of FIG. 4, may be supplied as part of such a software tool kit to developers of software that runs in a mobile station and that enables, for instance, the telephony application 24 to manage all aspects of a CS call.

Upon receiving the PS call request, the PS call manager 33 first checks whether or not there is a CS call in its call setup phase, before deciding whether or not to block the PS call. If there is a CS call in its setup phase (e.g., as reported by CS call protocol stack 31), then the PS manager 33 responds by starting a count down timer and in effect blocks the PS call (e.g., delays activation or allowance of the PS call) at least until the count down timer has expired. The count down timer may be a software timer that is initialized and managed by the PS manager 33, by being set to represent a predetermined time interval, e.g. a fixed time interval between about two and four seconds. The set time interval may be close to the time interval that is needed to complete the call setup phase of a typical CS call from the mobile station 2. This allows enough time for a typical CS call to complete its call setup phase, without risking that the CS call will be dropped by the RNC 6 (see FIG. 1, FIG. 2) due to the aforementioned issues that are created for the RNC 6 when it has been asked to simultaneously setup a PS call.

Now, upon the count down timer having expired, the PS manager 33 again checks whether or not any CS call setup is on-going; if so, then another count down timer may be started (e.g., may have the same time interval as the first count down timer) and the PS call continues to be blocked, at least upon expiry of the another timer. If not, then the PS manager 33 allows the PS call to proceed.

Still referring to FIG. 3, the mobile station 2 may include a user interface touch screen 20 which can display several graphical objects 21-23 during the in progress CS call. These include a call identifier object 21, which in the case of an outgoing call displays the name, telephone number or address of the called party. Alternately, the call identifier object displays the name, telephone number or address of the calling party in the case of an incoming call. Also shown is a calling object 22 which may be displayed upon initiation of an outgoing call, e.g. as soon as the near-end user has pressed the 'Send' button. The calling object 22 indicates to the near-end user that the initated call has not yet been established or connected, and may still be in its call setup phase. Once the connection for the call has been established (e.g., the far-end user has answered), the calling object 22 may be replaced with an elapsed time object (not shown) which shows a timer that measures how long the connected incoming call or outgoing call has been ongoing. Finally, this being a touch screen user interface, there is a keypad object 23, which may contain several virtual buttons that are typically present in a telephony handset including a mute or hold button, a speaker phone button, and a hang up or end button. As an alternative to the touch screen 20, a separate display and keyboard or keypad may be provided. A speaker 25 and microphone 26 may be integrated within the housing of the mobile station 2, such as an earpiece speaker or receiver that is located at one end of a cellular or smart phone handset, and a primary or speaker microphone at another end. Alternatively, the speaker 25 and microphone 26 may be part of a headset that is communicatively coupled to the handset via a cable connection or via a wireless connection.

Figure 4:
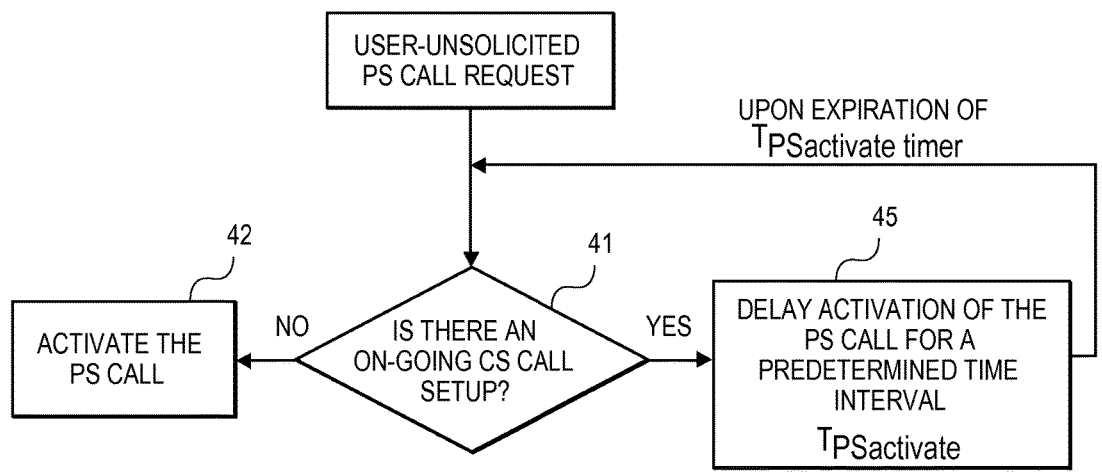
FIG. 4 is a flow diagram of an algorithm that can be performed by a PS call manager running in the mobile communications user equipment.

Turning now to FIG. 4, a flow diagram of an algorithm or process that can be performed by the PS call manager 33 within mobile communications user equipment (here, mobile station 2) is shown. Performance of this algorithm may occur in parts; in other words, not all of the branches and conditions shown are required in each instance. The process may be triggered by a PS call request that is received from a background task 32 (see FIG. 3). This may be a low priority background task, or a low priority request from a background task (collectively referred to in FIG. 4 as a user-unsolicited PS call request), where the background task has a lower priority for establishing a PS call than that of a foreground task that may, or may not, be running in the mobile station 2. There may also be at least one higher priority background task running in the mobile station 2. In another embodiment, the algorithm in FIG. 4 could apply to any PS call request regardless of the priority of the requesting background task.

Upon receipt of the PS call request, a check is made as to whether or not there is an on-going CS call setup (block 41). If so, then activation of the PS call is delayed for a predetermined time interval, e.g. a fixed time interval, represented by $T_{PSactivate}$ (block 45). If not, then the PS call may be activated immediately (block 42). Upon expiration of the timer, the process may loop back to block 41 where another check is made as to whether or not there is an ongoing CS call setup. The PS call may be activated by the PS call manger 33 sending a PDP context request through the PS call protocol stack 30 (see FIG. 3). The algorithm thus selectively blocks low priority PS background call requests, by delaying their allowance in a manner that is believed to reduce the likelihood of dropped calls due to multiple RABs (e.g., at least two that have different QoS) being present simultaneously and/or improve the call setup time performance in the mobile station 2.

As explained above, an embodiment of the invention may be a machine-readable medium (such as microelectronic memory) having stored thereon instructions, which program one or more data processing components (generically referred to here as "a processor") to perform the digital operations described above in connection with the PS call manager 33. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the mobile network architecture described in FIG. 1 and FIG. 2 has a UMTS terrestrial radio access network and UMTS cores (circuit and packet). The PS call manager may alternatively or in addition be configured to manage PS calls in a mobile station that complies with other popular mobile terrestrial cellular network specifications in the industry. These include radio interface technologies and core network architectures such as IMT-Advanced (International Mobile Telecommunications Advanced) featuring WiMax 2 as described in IEEE 802.16m, OFDMA (Orthogonal Frequency Division Multiple Access), and LTE-Advanced (Long Term Evolution) as described in 3GPP Technical Report (TR) 36.913 which features the Evolved Packet Core (EPC) also known as the System Architecture Evolution (SAE) core. The description is thus to be regarded as illustrative instead of limiting.

What is claimed is:

1. A method for managing, within a mobile communications user equipment, a packet service, PS, call, the method comprising:

while a circuit service, CS, call is in its call setup phase, receiving a request to establish a PS call, from a background task running in the mobile communications user equipment, wherein the background task has a lower priority for establishing the PS call than that of at least one other background task which is also running in the user equipment and that is not associated with the CS call; and during the call setup phase, in response to receiving the request from the background task, and further in response to the background task having the lower priority for establishing the PS call than that of the at least one other background task, starting a count down timer and blocking the PS call until the count down timer has expired.

2. The method of claim 1 further comprising in response to the count down timer having expired, checking whether or not any CS call is in its call setup phase.

3. The method of claim 2 further comprising in response to checking whether or not any CS call is in its call setup phase, blocking the PS call.

4. The method of claim 2 further comprising in response to checking whether or not any CS call is in its call setup phase, allowing the PS call.

5. The method of claim 1, wherein the count down timer has a duration between two and four seconds.

6. The method of claim 1, the method further comprising:
upon expiration of the count down timer, determining whether the CS call remains in its call setup phase; and
based on a determination that the CS call remains in its call setup phase upon expiration of the count down timer, restart the count down timer and block the PS call until the count down timer expires again.

7. A mobile telephony device comprising:
a processor; and
data storage having stored therein a telephony module that when executed by the processor is to manage a circuit service, CS, call that is in its call setup phase, and
a packet service, PS, call manager that when executed by the processor is to respond to a user-unsolicited request for a PS call in the mobile device by checking whether or not there is a CS call in its call setup phase, and if there is a CS call in its call setup phase then the PS manager is to respond by starting a count down timer and blocking the PS call until the count down timer has expired,
wherein the user-unsolicited request is from a background task running in the mobile telephony device, and wherein the background task has a lower priority for establishing a PS call than that of at least one other background task which is also running in the mobile telephony device and that is not associated with the CS call.

8. The mobile telephony device of claim 7 wherein in response to the count down timer having expired, the PS manager is to check again whether or not any CS call is in its call setup phase.

9. The mobile telephony device of claim 8 wherein in response to checking again whether or not any CS call is in its call setup phase, the PS manager is to block the PS call.

10. The mobile telephony device of claim 8 wherein in response to checking again whether or not any CS call is in its call setup phase, the PS manager is to allow the PS call.

11. The mobile telephony device of claim 7, wherein the count down timer has a duration between two and four seconds.

12. The mobile telephony device of claim 7, wherein the PS call manager is further executable by the processor to:
based on a determination that the CS call remains in its call setup phase upon expiration of the count down timer, restart the count down timer and block the PS call until the count down timer expires again.

13. An article of manufacture comprising:
a non-transitory machine-readable medium having stored therein instructions that, when executed by a processor in mobile telephony user equipment, control when a user-unsolicited packet service, PS, call request in the user equipment is allowed to proceed during the call setup phase of a circuit service, CS, call, wherein the user-unsolicited PS call request is from a background task running in the mobile telephony user equipment, and wherein the background task has a lower priority for establishing a PS call than that of at least one other background task which is also running in the mobile telephony user equipment and that is not associated with the CS call,
wherein the instructions program the processor to respond to the PS call request by checking whether or not any CS call setup is ongoing,
wherein if the CS call setup is not ongoing the instructions program the processor to immediately activate the PS call,
wherein if the CS call setup is ongoing and in response to the background task having a lower priority for establishing the PS call that that of the at least one other background task, the instructions program the processor to delay activation of the PS call for a predetermined time interval.

14. The article of manufacture of claim 13 wherein the stored instructions are such that the predetermined time interval is between two and four seconds.

15. The article of manufacture of claim 13 wherein the medium has stored therein further instructions that when executed by the processor again delay the activation of the PS call for said predetermined time interval, if a CS call setup is ongoing.

16. The article of manufacture of claim 13,
wherein in response to the predetermined time interval having expired, the instructions further program the processor to check again whether or not any CS call is ongoing.

17. The article of manufacture of claim 16,
wherein in response to checking again whether or not any CS call is ongoing, the instructions further program the processor to continue delaying activation of the PS call.

18. The article of manufacture of claim 16,
wherein in response to checking again whether or not any CS call is ongoing, the instructions further program the processor to activate the PS call.

* * * * *